United States Patent
Kulkarni et al.

(10) Patent No.: US 11,256,515 B2
(45) Date of Patent: Feb. 22, 2022

(54) TECHNIQUES FOR ACCELERATING COMPACTION

(71) Applicant: MARVELL ASIA PTE, LTD., Singapore (SG)

(72) Inventors: Chidamber Kulkarni, Richmond (CA); Rahul Jain, Hyderabad (IN); Prasanna Sundararajan, Palo Alto, CA (US)

(73) Assignee: MARVELL ASIA PTE LTD., Singapore (SG)

( * ) Notice: Subject to any disclaimer, the term of this patent is extended or adjusted under 35 U.S.C. 154(b) by 0 days.

(21) Appl. No.: 16/885,112

(22) Filed: May 27, 2020

(65) Prior Publication Data

US 2020/0379775 A1     Dec. 3, 2020

Related U.S. Application Data

(60) Provisional application No. 62/853,338, filed on May 28, 2019.

(51) Int. Cl.
*G06F 9/38*    (2018.01)
*G06F 9/30*    (2018.01)
*G06F 9/50*    (2006.01)

(52) U.S. Cl.
CPC ........ *G06F 9/3867* (2013.01); *G06F 9/30145* (2013.01); *G06F 9/3885* (2013.01); *G06F 9/5027* (2013.01)

(58) Field of Classification Search
CPC .............................. G06F 9/3867; G06F 9/3885
See application file for complete search history.

(56) References Cited

U.S. PATENT DOCUMENTS

| | | | |
|---|---|---|---|
| 2015/0301964 A1 | 10/2015 | Brinicombe et al. | |
| 2017/0083402 A1* | 3/2017 | Vishne | G06F 11/1076 |
| 2018/0286112 A1 | 10/2018 | Lauritzen et al. | |
| 2018/0300205 A1* | 10/2018 | Sehgal | G06F 11/1453 |
| 2018/0307711 A1 | 10/2018 | Kulkarni et al. | |
| 2019/0121581 A1 | 4/2019 | Choi et al. | |

OTHER PUBLICATIONS

"The write path to compaction," at https://docs.datastax.com/en/archived/cassandra/2.1/cassandra/dml/dml_write_path_c.html, retrieved Jul. 9, 2020.
"ArchitectureSSTable," at https://cwiki.apache.org/confluence/display/CASSANDRA2/ArchitectureSSTable, retrieved Jul. 9, 2020.
International Search Report for application No. PCT/US2020/034912 dated Aug. 10, 2020.

* cited by examiner

*Primary Examiner* — Zachary K Huson

(57) ABSTRACT

Techniques for accelerating compaction include compaction accelerator. The compaction accelerator includes a compactor separate from a processor performing read and write operations for a database or a data store. The compactor includes a plurality of compaction resources. The compactor is configured to receive a compaction request and data to be compacted, compact the data via a compaction pipeline to generate compacted data, and forward the compacted data to the processor, the database, or the data store. The compaction pipeline has a first portion of the plurality of compaction resources.

20 Claims, 8 Drawing Sheets

TECHNIQUES FOR ACCELERATING COMPACTION

CROSS-REFERENCE TO RELATED APPLICATIONS

This application claims the benefit of the U.S. Provisional Application titled "SYSTEM AND METHOD TO ACCELERATE COMPACTION," filed on May 28, 2019, and having Application No. 62/853,338, the subject matter of which is hereby incorporated by reference in its entirety.

BACKGROUND

Field of the Various Embodiments

The present disclosure relates generally to computing systems and the use of compaction by a compactor with allocable compaction resources.

Description of the Related Art

Log-structured merge-tree (LSM) data structures are used in many databases and data stores (e.g., NoSQL databases, Hadoop distributed file system (HDFS), etc.). LSM data structures are popular because they allow databases and data stores to leverage hierarchical memory and storage subsystems that are prevalent (e.g., DRAM memory, flash memories, etc.) in CPU-based server architectures. Specifically, use of LSM data structure enables the handling of insert/write operations significantly faster because writes and/or inserts append to a LSM data structure residing in a faster memory (e.g., DRAM) and a process to compact and merge all the writes corresponding to a specific location or key to persistent data store happens separately. This enables faster response times for write operations at the cost of performing a compaction process at a later time that determines the latest copy of a write, deletes all other older copies, and merges the write into another data structure on the disk, where a persistent copy of the data is stored.

In databases using LSM data structures, typically the CPU performs the compaction process, as well as handles the read and write operations. A drawback of this approach is that CPU utilization and resources are configured to be shared between compaction and reads/writes or are configured toward completing compaction quickly before handling reads/writes. For example, certain CPU cores may be allocated to compaction, and the remaining cores are allocated to handling reads and writes. Accordingly, when a compaction process is active, latencies for read and write operations can be negatively affected.

As the foregoing illustrates, what is needed are more efficient techniques and systems for performing compaction.

SUMMARY

According to some embodiments, a compaction accelerator includes a compactor separate from a processor performing read and write operations for a database or a data store. The compactor includes a plurality of compaction resources. The compactor is configured to receive a compaction request and data to be compacted, compact the data via a compaction pipeline to generate compacted data, and forward the compacted data to the processor, the database, or the data store. The compaction pipeline has a first portion of the plurality of compaction resources.

According to some embodiments, a system includes a compactor separate from a processor performing read and write operations for a database or a data store. The compactor includes a plurality of compaction resources. The compactor is configured to receive a compaction request and one or more tables to be compacted, compact the one or more tables via a compaction pipeline to generate a compacted table, and forward the compacted table to the processor, the database, or the data store. The compaction pipeline has a first portion of the plurality of compaction resources.

According to some embodiments, a method of database compaction performed by a compactor separate from a processor performing read and write operations for a database or a data store includes receiving a compaction request and data to be compacted, compacting the data via a compaction pipeline to generate compacted data, and forwarding the compacted data to the processor, the database, or the data store. The compaction pipeline having a set of compaction resources included in the compactor.

A technical advantage and improvement of the disclosed techniques is that compaction is performed by a dedicated compactor, which frees up CPU resources for read and write operations. Accordingly, read and write latencies are not significantly affected during compaction. A further technical advantage and improvement is that resources within the compactor are dynamically allocable into various compaction pipelines based on load, type of database being compacted, a type of merging mode, and so on, which further enhances flexibility and/or efficiency in the compaction process so that the compactor can easily be adapted based on the number and/or complexity of the compaction tasks that have been requested. Yet another technical advantage and technical improvement is that compaction pipelines can operate in parallel, thereby support many more compaction tasks concurrently, which further enhances compaction capacity and time to complete a requested compaction task.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Many database administrators, as well as applications that leverage data stores based on LSM data structures, have to take into account the fact that whenever a compaction process is running there will be an adverse impact on the read and write latencies to the databases or data stores because CPU utilization is configured to either be shared between compaction and read/write operations or configured towards finishing compaction quickly before processing read and write requests. In either approach, read and write latencies are negatively impacted, and compaction efficiency may be negatively affected as well.

Accordingly, compaction may be accelerated by having the compaction process performed by a compactor such as a field programmable gate array (FPGA), an application specific integrated chip or circuit (ASIC), a graphics processing unit (GPU), and/or the like. This enables the CPU to be utilized to provide better read and write latencies. Furthermore, the compactor can have allocable compaction resources that may be allocated into compaction pipelines that can operate in parallel, which furthers facilitates compaction efficiency. Additionally, by operating two or more compaction pipelines in parallel, the compaction system can support many more compaction tasks concurrently.

Figure 1:
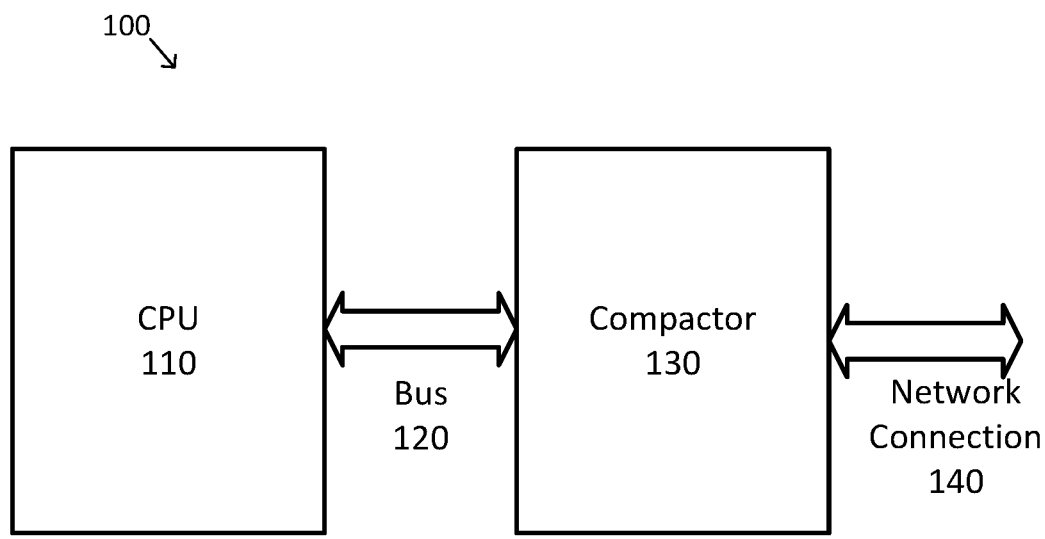
FIGS. 1-2 are simplified diagrams of possible compactor architectures, according to various embodiments.

FIG. 1 is a simplified diagram of a compactor architecture 100, according to various embodiments. As shown in FIG. 1, architecture 100 includes a CPU 110 coupled via a bus 120 to a compactor 130. In some examples, CPU 110 is representative only, and may alternatively be replaced with one or more central processing units, multi-core processors, microprocessors, microcontrollers, digital signal processors, FPGAs, ASICs, GPUs, and/or the like. In some examples, bus 120 may be compatible with a bus standard used to couple processors and peripherals devices, such as the Peripheral Component Interconnect Express (PCIe) standard and/or the like. In some examples, compactor 130 may be arranged as a plug-in card, such as a PCIe form factor card and/or the like. In some examples, compactor 130 may include one or more FPGAs, GPUs, ASICs, and/or other hardware-based cores as is described in further detail below. In architecture 100, the data required by compactor 130 is moved from memory of CPU 110 to memory of compactor 130 over bus 120. In some examples, cache coherency may additionally be supported over bus 120, but latency across bus 120 may be high. In some examples, the cache coherency may use the IBM Coherent Accelerator Processor Interface (CAPI). As further shown in FIG. 1, compactor 130 is coupled to one or more network connections 140. In some examples, the one or more network connections 140 may be one or more Ethernet connections (e.g., a 10 Gigabit Ethernet connection), Fibre Channel over Ethernet (FCoE) connections, one or more asynchronous transfer mode (ATM) connections, one or more Internet connections, and/or the like.

As discussed above and further emphasized here, FIG. 1 is merely an example which should not unduly limit the scope of the claims. One of ordinary skill in the art would recognize many variations, alternatives, and modifications. According to some embodiments, CPU 110 and compactor 130 may be coupled together using mechanisms other than bus 120. In some examples, CPU 110 and compactor 130 may be coupled over a network, such as by using a network connection similar to network connection 140.

Figure 2:
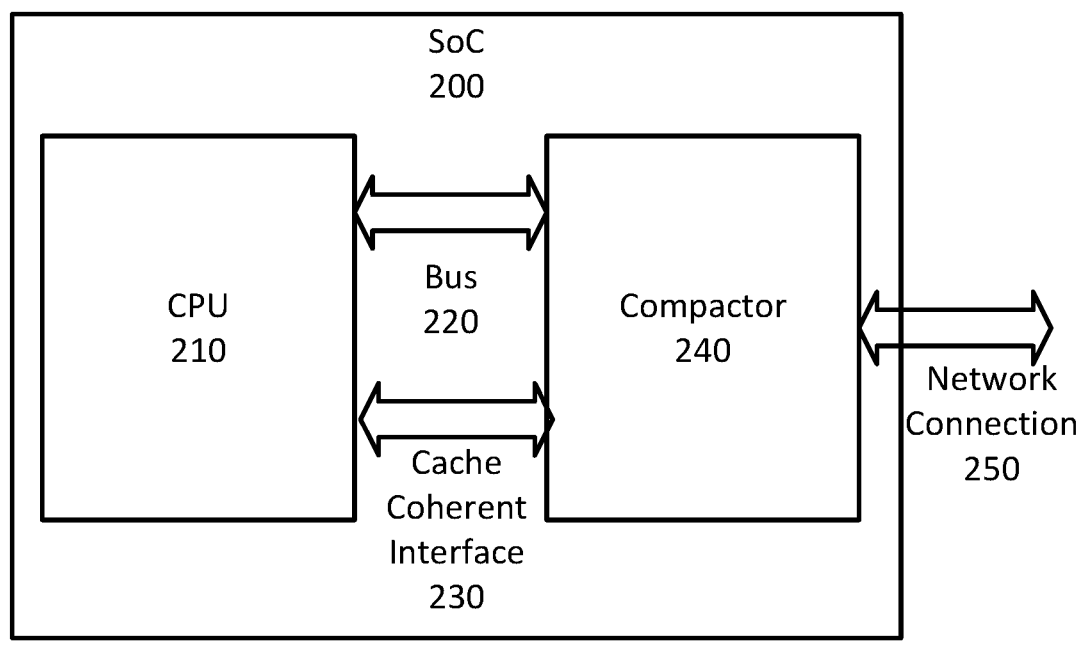

FIG. 2 is a simplified diagram of a compaction architecture based around a system on a chip (SoC) 200, according to various embodiments. Similar to architecture 100, SoC 200 includes a CPU 210 coupled via a bus 220 to a compactor 240, which are consistent with CPU 110, bus 120, and compactor 130, respectively. Additionally, compactor 240 is coupled to one or more network connections 250, which are consistent with the one or more network connections 140 of architecture 100. In contrast to architecture 100, CPU 210 and compactor 240 are further coupled using a cache coherent interface 230. An advantage of the architecture of SoC 200 over architecture 100 is that compactor 240 has access to the cache memory of CPU 210 via the high-speed interconnect of cache coherent interface 230.

According to some embodiments, the type and amount of data that is moved from the memory of CPUs 110 and/or 210 to the memory of compactors 130 and/or 240 is relevant to the choice of whether to use architecture 100 and/or SoC 200 for a particular compactor. In the examples of FIG. 1, the data movement is important for architecture 100 to be effective. In the examples of FIG. 2, there is no movement of data between the memory of CPU 210 and the memory of compactor 240 because the memory of CPU 210 is accessible to compactor 240 via cache coherent interface 230, thus resulting in much lower data communication overhead.

According to some embodiments, the kind of data per column family that is moved from CPU memory to the FPGA memory (or accessed in the CPU memory via cache coherence) may include one or more sorted string tables (SSTables). In general, a SSTable is similar to a key-value pair representation. In various embodiments, the values in a SSTable are stored as a column family where there may be many columns for each key. In addition, each column may have its own time-to-live (TTL) and timestamp. In some examples and depending on the size of a memtable structure in memory, these column families may vary greatly in size. In some examples, there are various strategies to keep memtable sizes restricted to a preset size (e.g., 20 MBytes per memtable).

In some embodiments, compactor architecture 100 or 200 further includes non-volatile memory (e.g., flash memory, solid state memory). The non-volatile memory is accessible to compactor 130/240 via a bus similar to bus 120/220. For example, compactor 130/240 could have a bus interface (e.g., PCIe interface) coupled to bus 130/220 that is a PCIe bus and to another PCIe bus to the non-volatile memory.

In various embodiments, the compactor (e.g., compactor 130, compactor 240) includes compaction resources, which are modules within the compactor for performing various tasks in the compaction process. In various embodiments, the compaction resources include one or more decoder engines, one or more compaction engines, and one or more encoder engines. The decoder engine(s) read and decode database data into a format that can be processed by the compaction engine. The compaction engine(s) perform the compaction process on the decoded data. The encoding engine(s) encode the result of compaction from the compaction engine into data to be stored back into the database. For example, the decoding engine(s) decode database data into SSTable format data, and the SSTable data is processed by the compaction engines to compact the data into compacted SSTable data. The compacted SSTable data is then encoded by the encoding engines back into a format for storage in the database. A compactor may have decoder engines and encoder engines for one database format or for multiple database formats. In some embodiments, the compaction resources are allocable into a plurality of compaction pipelines. The compactor may allocate the resources based on one or more criteria (e.g., database formats of tables to be processed, load balancing considerations (e.g., number of tables to be processed, number of tables to be processed per format)). Accordingly, the compactor is an overarching compaction module, and the compaction resources are internal compaction modules or sub-modules. Resources may be re-allocated dynamically (e.g., on the fly based on load and/or for an outstanding compaction request or task) and/or periodically. Compaction resources and allocation are further discussed below.

Figure 3A:
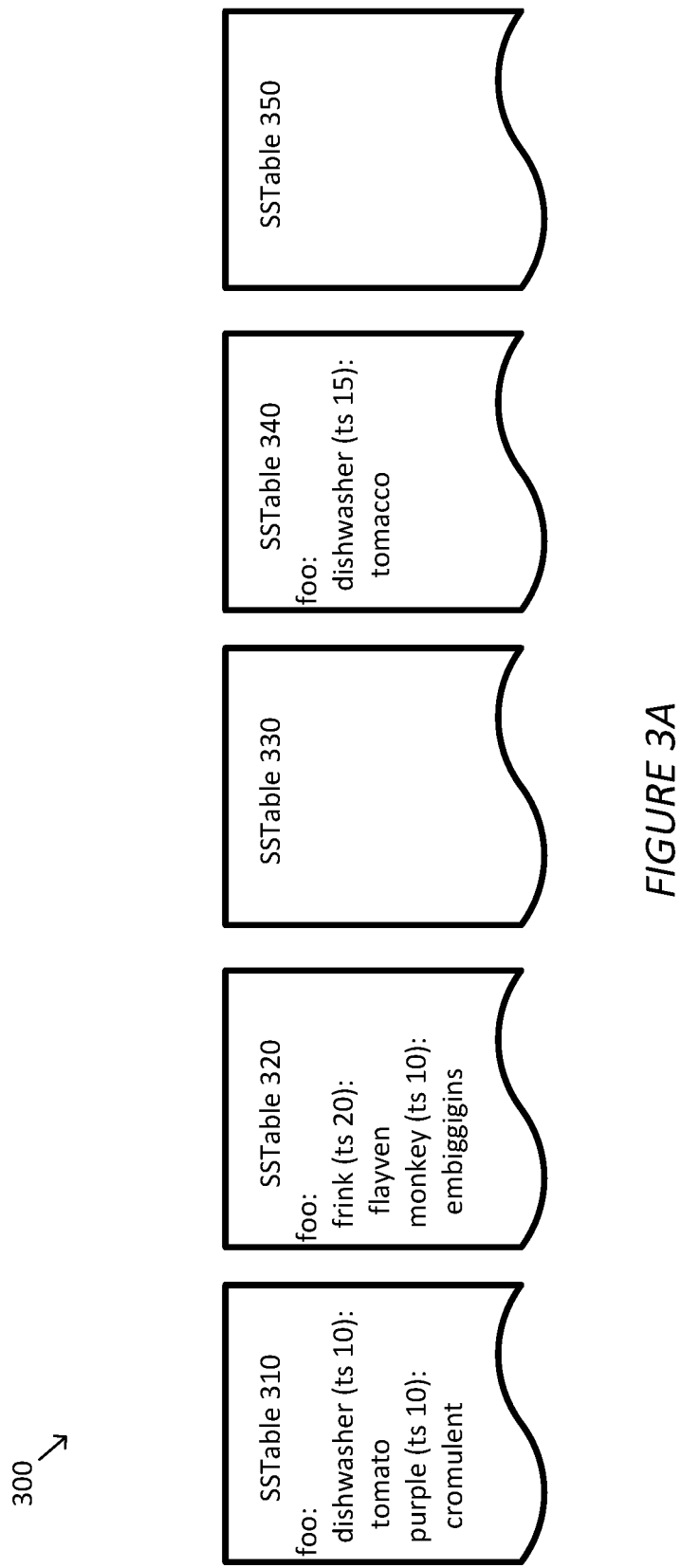
FIGS. 3A-3B are simplified diagrams of example tables, according to various embodiments.

FIG. 3A is a simplified diagram of an example table 300, according to various embodiments. As shown in FIG. 3A, table 300 includes several versions SSTable 310 through SSTable 350 accumulated over time as data is written to the database storing table 300. SSTable 310 includes data for dishwasher (with timestamp 10), tomato, purple (with timestamp 10), and cromulent. SSTable 2 320 includes data frink (with timestamp 20), flayven, monkey (with timestamp 10), and embiggins. SSTable 340 includes data dishwasher (with timestamp 15) and tomacco. Table 300 demonstrates some of the improvements obtained by using compaction. For example, the data dishwasher with timestamp 15 in SSTable 340 is a more recent version of data dishwasher than is included in SSTable 310, which has an earlier timestamp of 10. Thus, the earlier version of data dishwasher in SSTable 310 may be discarded (e.g., compacted out of table 300).

In some embodiments, when data is compacted out of a database table (e.g., data dishwasher in table 300; data for keys k4, k5, k7, and k10 in table 360), it may be helpful to remove that compacted data using a two-step process to ensure that data synchronization is maintained between different replications of the database tables across different storage nodes, which may have duplicate copies of some of the database table versions, processing being handled by different compaction engines, and/or the like. In some examples, tombstones are used to address this. In some examples, before data is removed and/or discarded, its removal is recorded using a tombstone that indicates that the data is to be removed from all replications and/or compaction engines even though a local compactor and/or compaction engine may not know that it has been superseded and/or deleted. Once the tombstone has served its purpose, it may be removed and the corresponding storage freed up for additional data.

According to some embodiments, the use of hardware-based cores for compactors 130 and/or 240 may provide numerous advantages over software-based compaction solutions. In some examples, the database to be compacted may store various types of date and/or time information (e.g., timestamps, TTL values, and/or the like). In some examples, date and/or time information is stored in a format where year, month, day, hour, minute, and/or second information is separately represented so as to avoid the need for complex and/or time consuming date and time conversion functions, millennial roll-over concerns, and/or the like. As an example, a date-time value may be stored in the format "% Y-% m-% d % H:% M", which also supports ease of presenting the dates and/or times to human users. In some examples, date-time information in this format may be stored using 13 bits for the year, 4 bits for the month, 5 bits for the days, 5 bits for the hours, and 8 bits for the minute. However, software-based date and time comparators would include 5 separate cascaded comparisons to determine whether one date-time value is larger or smaller than another. In contrast, a hardware-based solution may utilize a single 35-bit comparator that can make the same larger or smaller determination using a single comparator cycle.

In some examples, hardware-based solutions may also provide faster access than software-based approaches to the TTL, timestamp, and/or column data information from a database row. As an example, a row from a database table, such as an SSTable, may be stored in hardware registers of custom width rather than the standard register widths as would be used in CPU executing software. In some examples, this allows barrel shifters to be used to easily extract the TTL, timestamp, and/or column data information from the database row without having to use much more complex and time-consuming software to identify and index into the desired column of information. Thus, by using the custom-width register, any column of data may be accessed in a single cycle.

Figure 3B:
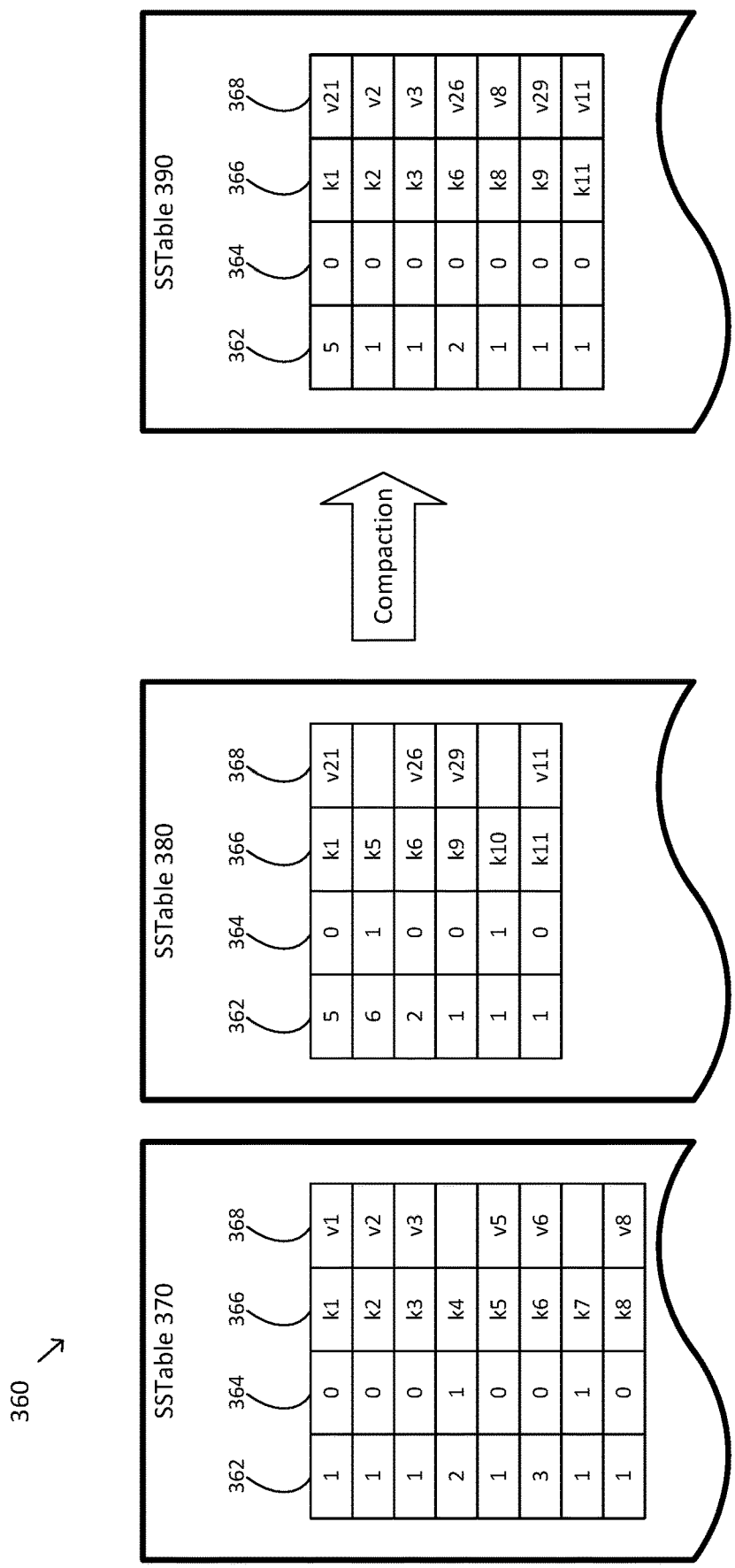

FIG. 3B is a simplified diagram of another example table, according to various embodiments. As shown in FIG. 3B, table 360 includes SSTable 370 and SSTable 380 accumulated over time as data is written to the database storing table 360. In FIG. 3B, data in SSTable 360 are illustrated as tables having columns 362, 364, 366, and 368. Column 362 corresponds to a timestamp field. Column 364 corresponds to a delete flag field. Column 366 corresponds to a key field for key-value pairs, and column 368 corresponds to a value field for key-value pairs. It should be appreciated that timestamps in column 362 are shown in FIG. 3B as, for simplicity, numerals indicating how new the key-value pair in the row is amongst key-value pairs with the same key—the larger the numeral value, the newer or later the key-value pair amongst key-value pairs with the same key. Additionally, as shown, delete flag 364 indicates that the entry for which the delete flag is set, and all prior (e.g., earlier timestamp) entries having the same key as the entry for which the delete flag is set, are to be discarded.

As shown, SSTable 370 includes the key-value pairs [k1, v1] with timestamp 1 and a delete flag 0, [k2, v2] with timestamp 1 and delete flag 0, [k3, v3] with timestamp 1 and delete flag 0, [k4, null] with timestamp 2 and delete flag 1, [k5, v5] with timestamp 1 and delete flag 0, [k6, v6] with timestamp 3 and delete flag 0, [k7, null] with timestamp 1 and delete flag 1, and [k8, v8] with timestamp 1 and delete flag 0. SSTable 380 includes the key-value pairs [k1, v21] with timestamp 5 and a delete flag 0, [k5, null] with timestamp 6 and delete flag 1, [k6, v26] with timestamp 2 and delete flag 0, [k9, v29] with timestamp 1 and delete flag 0, [k10, null] with timestamp 1 and delete flag 1, and [k11, v11] with timestamp 1 and a delete flag 0.

As shown, both SSTable 370 and SSTable 380 include values for the key k1. However, the key-value pair [k1, v21] in SSTable 380 has the later timestamp. Accordingly, the key-value pair [k1, v1] in SStable 370 may be discarded (e.g., compacted out of table 360). Key-value pair [k5, null] in SSTable 380 has the later timestamp among data for key k5 and also has a set delete flag (1). Accordingly, key-value pair [k5, null] in SSTable 380 and earlier key-value pair [k5, v5] in SSTable 370 are discarded (e.g., deleted from table 360 during compaction).

SSTable 390 shows the data remaining in table 360 after compaction of SSTables 370 and 380. SSTable 390 includes the key-value pairs [k1, v21] with timestamp 5 and a delete flag 0, [k2, v2] with timestamp 1 and delete flag 0, [k3, v3] with timestamp 1 and delete flag 0, [k6, v26] with timestamp 2 and delete flag 0, [k8, v8] with timestamp 1 and delete flag 0, [k9, v29] with timestamp 1 and delete flag 0, and [k11, v11] with timestamp 1 and a delete flag 0. Data for keys k4, k5, k7, and k10 have been deleted from table 360 based on set delete flags for key-value pairs having those keys.

In various embodiments, data to be deleted may be marked using a tombstone (e.g., a tombstone flag). For example, if there are multiple entries with the same key, the latest entry (e.g., the entry with the latest timestamp) amongst those entries is kept, and earlier entries with the same key are marked with a tombstone. As shown, the delete flag 364 can also serve as a tombstone flag indicating that an entry is marked with a tombstone. For example, the delete flag 364 can be set for all entries other than the latest entry with the same key.

Figure 4A:
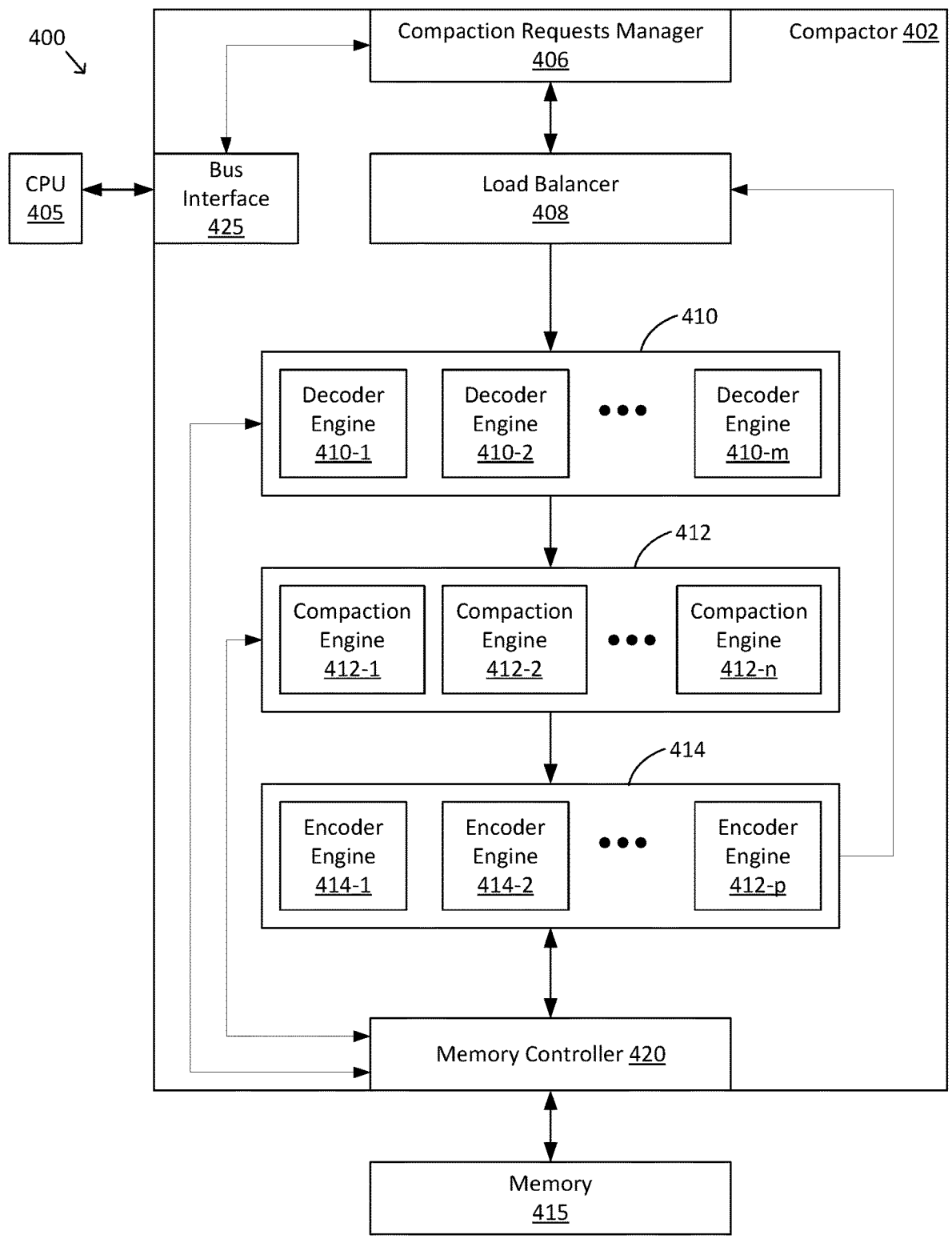
FIGS. 4A-4B are diagrams of an example compaction system, according to various embodiments.
Figure 4B:
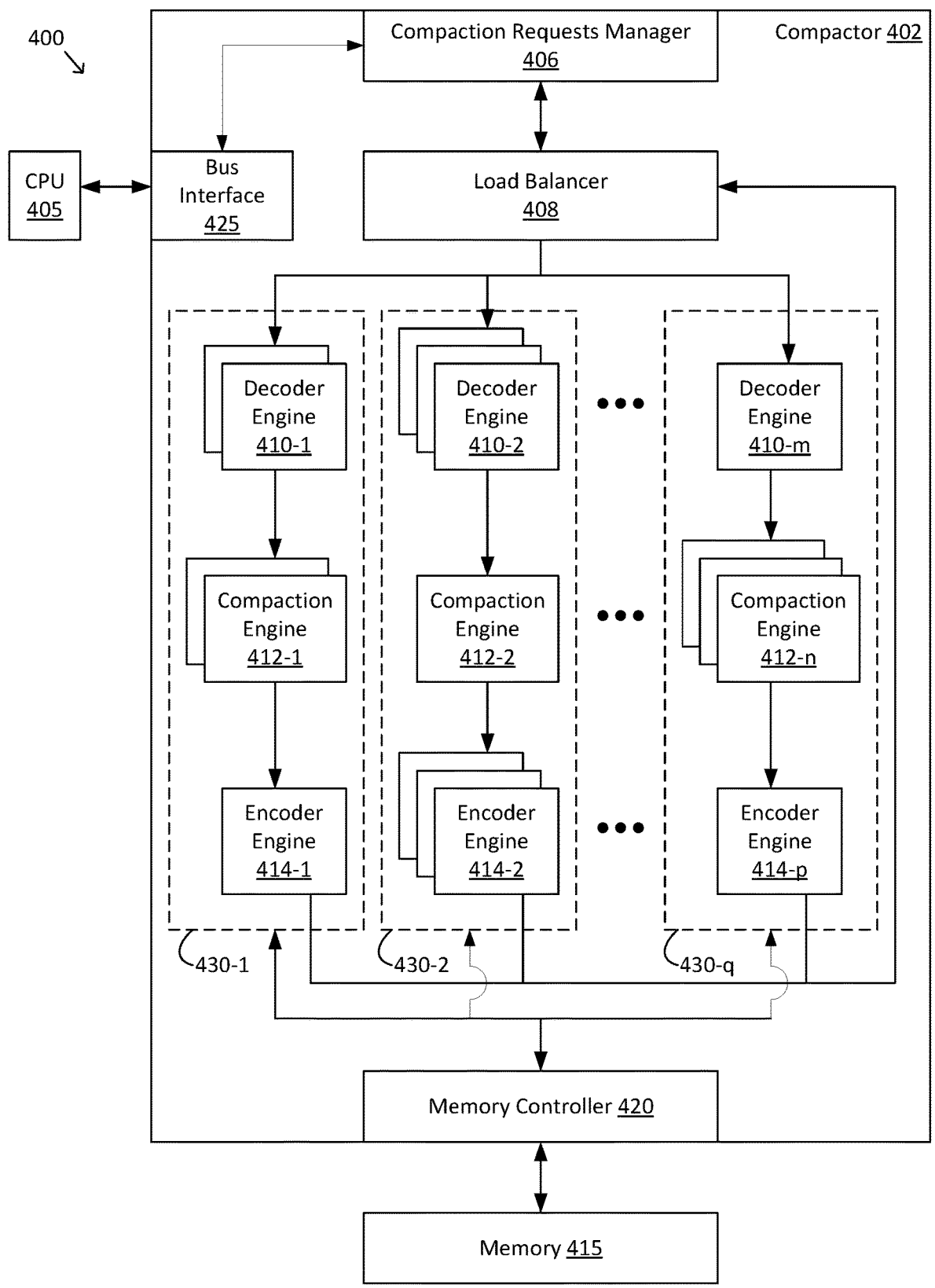

FIGS. 4A-4B are diagrams of an example compaction system 400, according to various embodiments. As shown in FIG. 4A, compaction system 400 includes a CPU 405 coupled to a compactor 402 via, for example, a bus and/or a cache coherent interface. In some embodiments, CPU 405 is consistent with CPU 110 and/or CPU 210. In some embodiments, compactor 402 is consistent with compactor 130 and/or compactor 240 and may be implemented using one or more FPGAs, ASICs, GPUs, and/or the like. Compactor 402 is further coupled to memory 415. In some examples, memory 415 may include static RAM (SRAM), dynamic RAM (DRAM), synchronous DRAM (SDRAM), and/or the like, which may be used for the storage of data (e.g., data from database tables) being managed by CPU 405, interim computing results, and/or the like. Compactor 402 includes a memory controller 420, such as a DRAM controller, for reading and/or writing data to and/or from memory 415, queuing memory access commands, buffering data, caching data, and/or the like.

Compactor 402 also includes a bus interface 425. Bus interface 425 is used by compactor 402 to communicate with CPU 405, such as for accessing data stored in a database accessed by CPU 405 and/or providing compacted data to be stored in the database. In some examples, the database is stored by CPU 405 in one or more hard disks, RAID arrays, solid-state drives, cloud storage systems (e.g., network-attached storage (NAS), storage area networks (SANs), and/or the like), and/or the like. In some examples, bus interface 425 may be a PCIe bus interface and/or the like.

Compactor 402 further includes a compaction requests manager 406 and a load balancer 408. Compaction requests manager 406 keeps track of compaction tasks or requests at a high level (e.g., at the per task or request level), and is responsible for communication with CPU 405. Compaction requests manager 406 also manages transferring of data between CPU 405 and compactor 402. In operation, compaction requests manager 406 receives compaction requests and tables for which compaction is requested from CPU 405, and forwards the requests and tables to load balancer 408. Compaction requests manager 406 also tracks the receipt and completion of the compaction requests. Further, compaction requests manager 406 forward the compaction results for each compaction task (e.g., stores the compacted data into the database and/or returns the compacted data to CPU 405). In some embodiments, compaction requests manager 406 updates the database when there are no outstanding compaction requests (e.g., compaction requests received to date have been completed and no compaction request is in progress).

Load balancer 408 manages compaction requests at the data level. Load balancer 408 determines a compaction workload (e.g., the amount of data to be compacted across the requests received from compaction requests manager 406), and distributes the data to be compacted across a plurality of modules and/or compaction pipelines. In some embodiments, load balancer 408 also, based on the compaction workload, allocates and re-allocates compaction resources (e.g., decoder engines, compaction engines, encoder engines available in corresponding resource pools, etc.) to create one or more compaction pipelines, and distributes the data to be compacted across the pipelines. In some embodiments, load balancer 408 can create compaction pipelines for various database formats. That is, load balancer 408 can create a first set of one or more compaction pipelines for compacting data received in a first database format, a second set of one or more compaction pipelines for compacting data received in a second database format, and so on. Load balancer 408 can distribute compaction requests or tasks to various pipelines based on the database format of the data to be compacted. Load balancer 408 also receives compacted data corresponding to outstanding compaction requests and forwards the compacted data to compaction requests manager 406. Load balancer 408 further updates the compaction workload as compaction requests are processed and compacted data are received, and load balancer 408 may reallocate compaction resources based on the updated workload. For example, load balancer 408 tracks the progress at each compaction pipeline (e.g., compaction pipelines 430) and determines when a pipeline is available for a next compaction request. Further, in some embodiments, load balancer 408 can allocate or re-allocate compaction resources into a pipeline on-the-fly for an incoming or outstanding request. For example, load balancer 408 could allocate resources into a pipeline in response to receiving a compaction request or task from compaction requests manager 406. Additionally, in some embodiments, when a compaction pipeline has completed its compaction tasks and accordingly its compaction resources are idle, load balancer 408 may re-allocate the resources in that pipeline to other pipelines or free up those resources (e.g., de-allocate those resources) for later re-allocation. Accordingly, compaction pipelines can be retained indefinitely (e.g., until the next periodic resource re-allocation) or created and un-created dynamically based on outstanding compaction requests or lack thereof.

In some embodiments, compaction requests manager 406 includes one or more finite state machines (FSMs). For example, compaction requests manager 406 may track the status of a request via a sequence of states (e.g., a "request received" state, a "request in progress" state, and a "request completed" state) in an FSM that changes state based on certain data or actions. For example, the FSM would go from a null or idle state to a request received state when a request is received from CPU 405. Compaction requests manager 406 then forwards the request to load balancer 408, and in response the FSM would go to the request in progress state. When compaction requests manager 406 receives the compacted data corresponding to the request from load balancer 408, the FSM would go to the request completed state. When compaction requests manager 406 forwards the compacted data away from compactor 402 (e.g., to CPU 405, to non-volatile memory via bus interface 425), the FSM would advance back to the null state.

Further, in some embodiments, compaction requests manager 406 includes one or more "receive" (Rx) FSMs and one or more "transmit" (Tx) FSMs. The Rx FSM(s) receive and track incoming compaction requests and data from CPU 405, and forwards the incoming requests and data to load balancer 408. The Tx FSM(s) receive and track outgoing compacted data as compaction requests are processed and clears completion requests. In some embodiments, the Rx FSMs and the Tx FSMs are communicatively coupled. For example, when a request is completed, a Tx FSMs can signal a Rx FSM that the request is completed and can go back to the null state.

In some embodiments, load balancer 408 includes one or more "receive" (Rx) load balancers and one or more "transmit" (Tx) load balancers. The Rx Load balancers can receive requests from compaction requests manager 406 and distribute requests to compaction pipelines 430 for processing. Tx load balancers can track completion of requests and free up a pipeline for the next request.

Compactor 402 further includes a number of compaction resources, including a plurality of decoder engines 410-1 thru 410-$m$, a plurality of compaction engines 412-1 thru 412-$n$, and a plurality of encoder engines 414-1 thru 414-$p$. The resources can be allocated by load balancer 408 into any number of compaction pipelines 430, which are further discussed below in conjunction with FIG. 4B. In various embodiments, compaction resources are logic blocks implemented in an FPGA. In the FPGA, different logic blocks may be programmed to serve as different compaction resources, and the number of decoder engines 410, compaction engines 412, and encoder engines 414 in the FPGA are configurable by a user (e.g., a user can re-configure the FPGA).

Decoder engines 410 decode table data received from load balancer 408. Decoder engine 410 converts (e.g., decodes) data in tables received from load balancer 408 from a database format in which the data is received into a common format for compaction engines 412. In some embodiments, the common format is the SSTable format. In some embodiments, the database format is a format specific to the type of database being compacted (e.g., NoSQL, Hadoop, Cassandra, RocksDB etc.). If the received table is already in the common format (e.g., the table is an SSTable), then decoder engine 410 can forward the data to compaction engines 412 without converting the data. In some embodiments, load balancer 408 can allocate a decoder engine 410 from a pool of decoder engines 410.

Compaction engines 412 perform compaction operations on the table data. In some embodiments, the operations include sorting entries (e.g., rows in SSTable 370 or 380, FIG. 3B) in the tables based on the timestamp of the entry and merging entries. Additionally, compaction engines 412 can mark entries as tombstones and/or for deletion (e.g., marking an entry with a tombstone, setting a tombstone or deletion flag for an entry). Compaction engine 412 may include respective engines for performing the sorting, merging, and tombstone marking operations (e.g., sort engines, table merge engines, etc.). Further details regarding the sorting, merging, and tombstone marking operations are described in the U.S. patent application titled "SYSTEM AND METHOD TO ACCELERATE COMPACTION," filed on Apr. 24, 2018, and having application Ser. No. 15/961,421, the subject matter of which is hereby incorporated by reference in its entirety. In some embodiments, load balancer 408 can allocate a compaction engine 412 from a pool of compaction engines 412.

Encoder engines 414 encode compacted data received from compaction engines 412 back into a database format and forward the encoded data to load balancer 408. Encoder engine 414 converts (e.g., encodes) compacted data in the common format back into the database format in which the corresponding original data was received. If the original corresponding data is in the common format, then encoder engine 414 can forward the compacted data to load balancer 408 without converting the compacted data. In some embodiments, load balancer 408 can allocate an encoder engine 414 from a pool of encoder engines 414.

In some embodiments, compactor 402 can include decoder engines 410 and encoder engines 414 dedicated to various database formats. For example, compactor 402 could include decoder engines and encoder engines assigned to decode and encode a first database format, decoder engines and encoder engines assigned to decode and encode a second database format, and so forth.

Compaction resources 410, 412, and 414 can access memory 415 via memory controller 420. In particular, each resource 410-1 thru 410-$m$, 412-1 thru 412-$n$, and 414-1 thru 414-$p$, can individually access memory 415 via memory controller 420. Accordingly, compaction resources 410, 412, and 414 may use memory 415 to store data, interim computing or operation results, and/or the like.

FIG. 4B illustrates compaction system 400 with compaction resources 410, 412, and 414 allocated into a plurality of compaction pipelines 430. In operation, load balancer 408 allocates compaction resources 410, 412, and 414 into compaction pipelines 430 based on overall load, load per database format, etc. For example, pipeline 430-1 includes a number of decoder engines including decoder engine 410-1, a number of compaction engines including compaction engine 412-1, and a number of encoder engines including encoder engine 414-1. Pipeline 430-2 includes a number of decoder engines including decoder engine 410-2, a number of compaction engines including compaction engine 412-2, and a number of encoder engines including encoder engine 414-2. Pipeline 430-3 includes a number of decoder engines including decoder engine 410-3, a number of compaction engines including compaction engine 412-3, and a number of encoder engines including encoder engine 414-3. The numbers of decoder engines 410, compaction engines 412, and/or encoder engines 414 need not be the same across compaction pipelines 430 or within a compaction pipeline 430. For example, one pipeline could have one decoder engine and the other pipeline could each have multiple decoder engines. As another example, pipeline 430-$q$ as shown includes one decoder engine 410-$m$ and one encoder engine 414-$p$, and multiple compaction engines 412.

In operation, compaction requests manager 406 receives data to be compacted and transmits the data to load balancer 408. Load balancer 408 receives the data and transmits the data into one or more compaction pipelines 430. Load balancer 408 may distribute, for a certain database format and/or a certain database, the data into one or more compaction pipelines 430, and into one or more decoder engines 410 within the pipeline. Within a compaction pipeline 430, decoder engine(s) 410 receives data from load balancer 408, decodes the data, and transmit (e.g., distribute) the decoded data into compaction engines 412 within the pipeline. Compaction engines 412 perform compaction operations (e.g., sorting, merging, etc.) to compact the data and then transmit the compacted data to encoder engines 414 within the pipeline. Encoder engine(s) 414 encode the compacted data and transmit the data back to load balancer 408, which transmits the compacted data back to compaction requests manager 406, which proceeds to update the database with the compacted data.

Figure 5A:
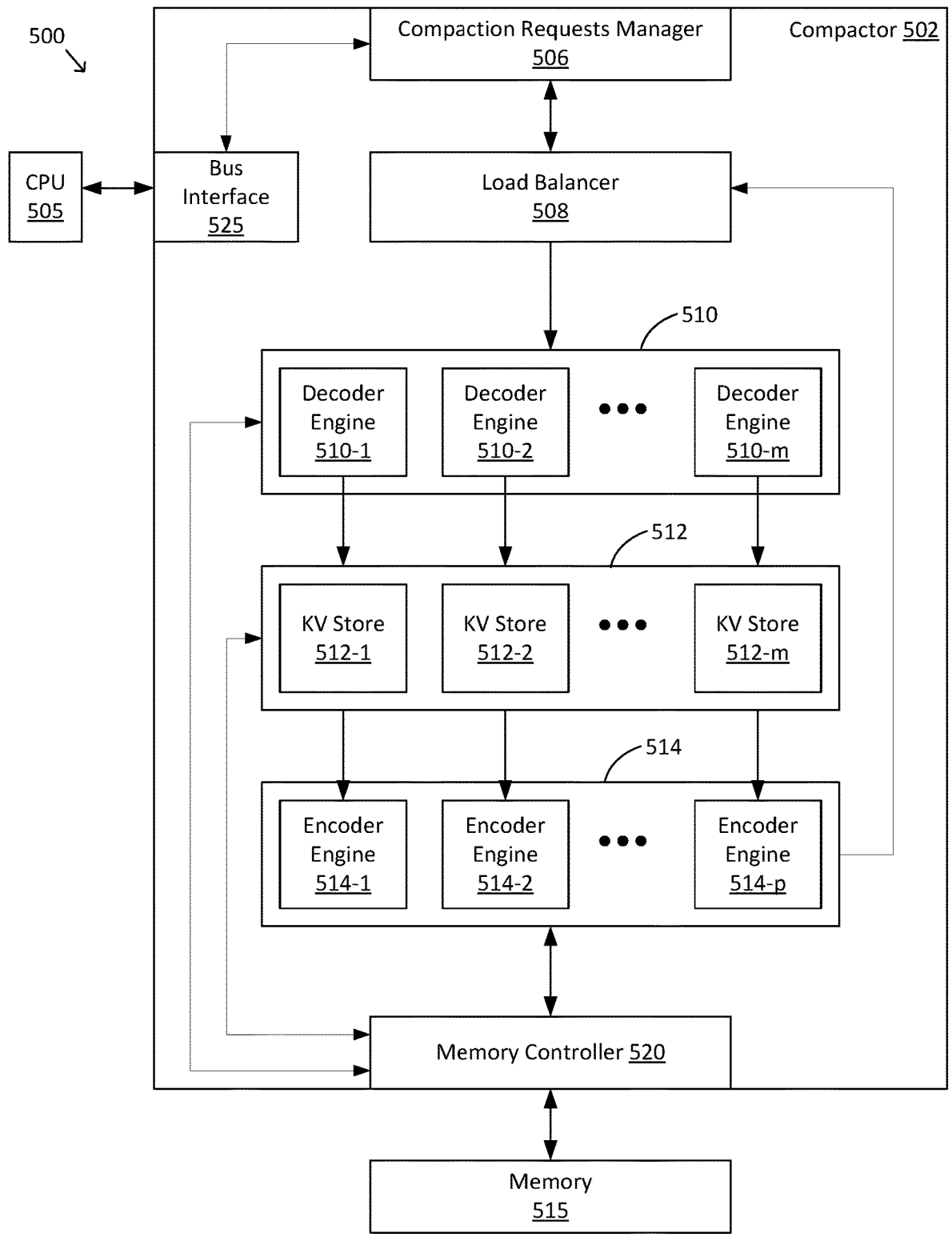
FIGS. 5A-5B are diagrams of another example compaction system, according to various embodiments.
Figure 5B:
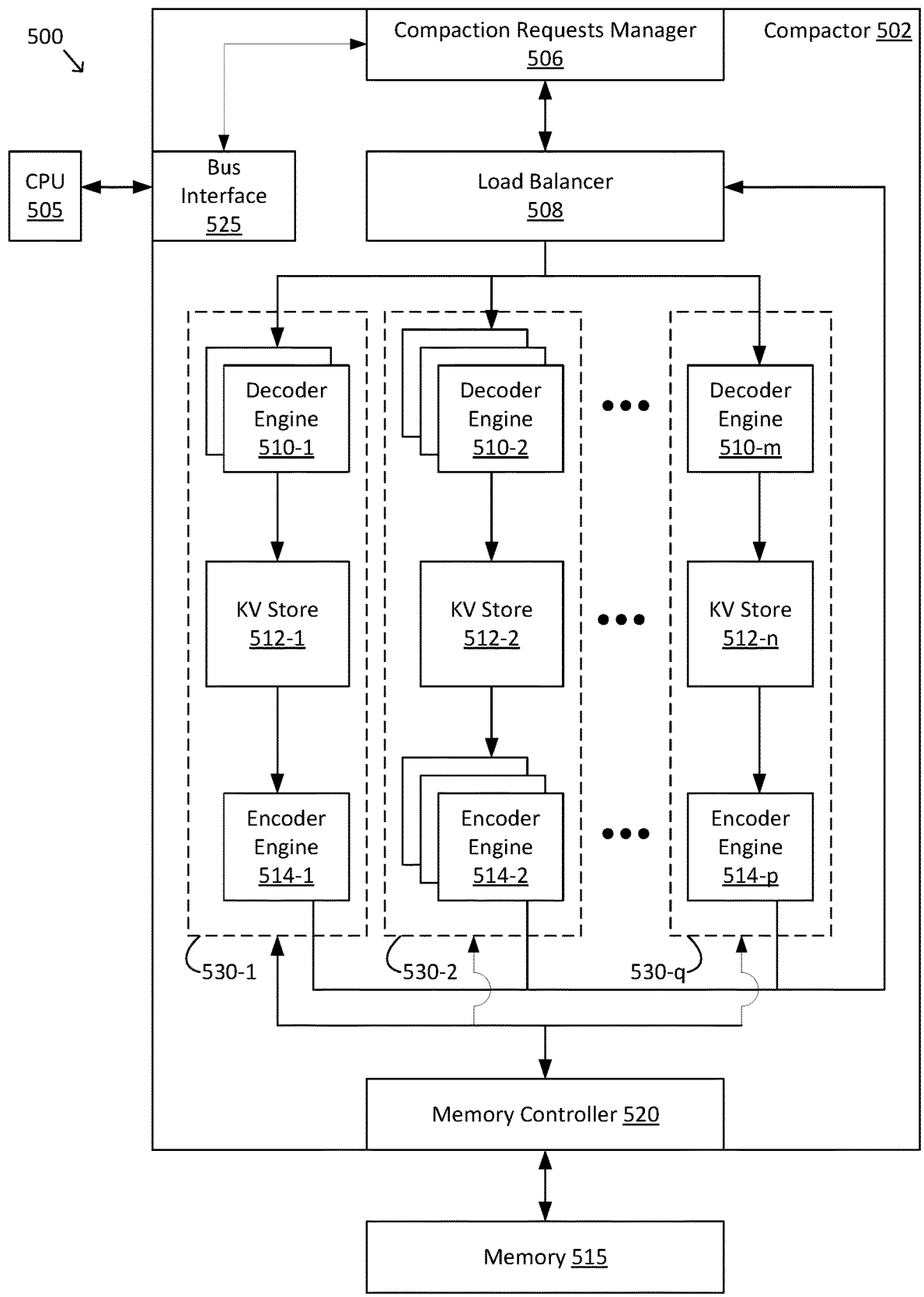

FIGS. 5A-5B are diagrams of another example compaction system 500, according to various embodiments. Compactor 502 of compaction system 500 includes many similar components as compaction system 400. For example, CPU 505, bus interface 525, compaction requests manager 506, load balancer 508, memory controller 520, and memory 515 are similar to their namesake counterparts in compaction system 400 as shown in FIGS. 4A-4B, except for any differences described below. Accordingly, details regarding these components are omitted here for sake of brevity.

Compactor 502 also includes decoder engines 510-1 thru 510-$m$ and encoder engines 514-1 thru 514-$p$. These components are also similar to their namesake counterparts in compaction system 400 as shown in FIGS. 4A-4B, except for any differences described below. Accordingly, details regarding these components are omitted here for sake of brevity.

In compaction system 500, the one or more compaction engines 412 for a compaction task are replaced by a key-value (KV) store 512. In various embodiments, KV store 512 is a storage space (e.g., memory, register) for storing multiple entries. In particular, KV store 512 stores entries that is to be kept in the compaction process (e.g., the latest entry for a given key). In some embodiments, KV store 512 is a multi-port KV store that can receive key-value pairs to store concurrently from multiple decoder engines 410. That is, each of decoder engines 510 in a compaction pipeline 530 has a direct communicative connection to the KV store 512 in the same compaction pipeline 530, and each of encoder engine 514 has a direct communicative connection to the KV store 512 in the same compaction pipeline 530. Accordingly, each decoder engine 510 can directly insert data (e.g., entries) into the respective KV store 512, and each encoder engine 514 can retrieve data from respective KV store 512.

In operation, load balancer 508 allocates one or more decoder engines 510, a KV store 512, and one or more encoder engines 514 into each of compaction pipelines 530-1 thru 530-$q$, as shown in FIG. 5B. Each compaction pipeline 530 can insert data into and retrieve data from its respective KV store 512 via the direct communicative connections within the pipeline (e.g., the connections to the decoder engines and encoder engines within the pipeline). For example, KV store 512-1 is allocated to compaction pipeline 530-1, KV store 512-2 is allocated to compaction pipeline 530-2, and KV store 512-$n$ is allocated to compaction pipeline 530-$q$.

Compactor 502 can be configured to compact the data by merging the data in a certain manner. Accordingly, the KV stores 512 in each compaction pipeline 530 can be configured to be operating in one of multiple merging modes. Examples of merging modes in which data may be merged include retaining the latest or most recent (e.g., latest timestamp) value for a given key, retaining all values for a given key and sorting them by timestamp, appending values for a given key, adding values for a given key, and so forth. For example, KV stores 512 configured to merge by retaining the latest value would retain a key-value pair when the timestamp indicates that it is more recent than the currently stored key-value pair with the same key and ignored when the timestamp is less recent. As another example, KV stores 512 configured to merge by adding values would add each received value for a given key to the currently stored value for the given key in KV stores 512. In some embodiments, KV stores 512 can include processing or control logic to retain, add, or append key-value pairs in accordance with the merging mode to which compactor 502 is configured. In some other embodiments, decoder engines 510 can insert key-value pairs into KV stores 512 (e.g., selectively insert, insert with an append operation, etc.), in accordance with the merging mode to which compactor 502 is configured, in order to retain the latest value, add values, append values, etc. Encoder engines 514 retrieve the data from respective KV store 512, which is in effect compacted, in order sorted by timestamp and encodes the data accordingly. Additionally, in some embodiments, some compaction pipeline 530 within compactor 502 can be configured to a different merging mode from other compaction pipelines 530 within compactor 502 (e.g., some pipelines are configured to retain the latest value for a given key and some other pipelines are configured to add values for a given key)—the merging mode needs not be the same across all compaction pipelines 530 in compactor 502. Accordingly, load balancer 408 can distribute compaction tasks and data to be compacted to compaction pipelines 530 based on the merging modes of the individual compaction pipelines 530.

Figure 6:
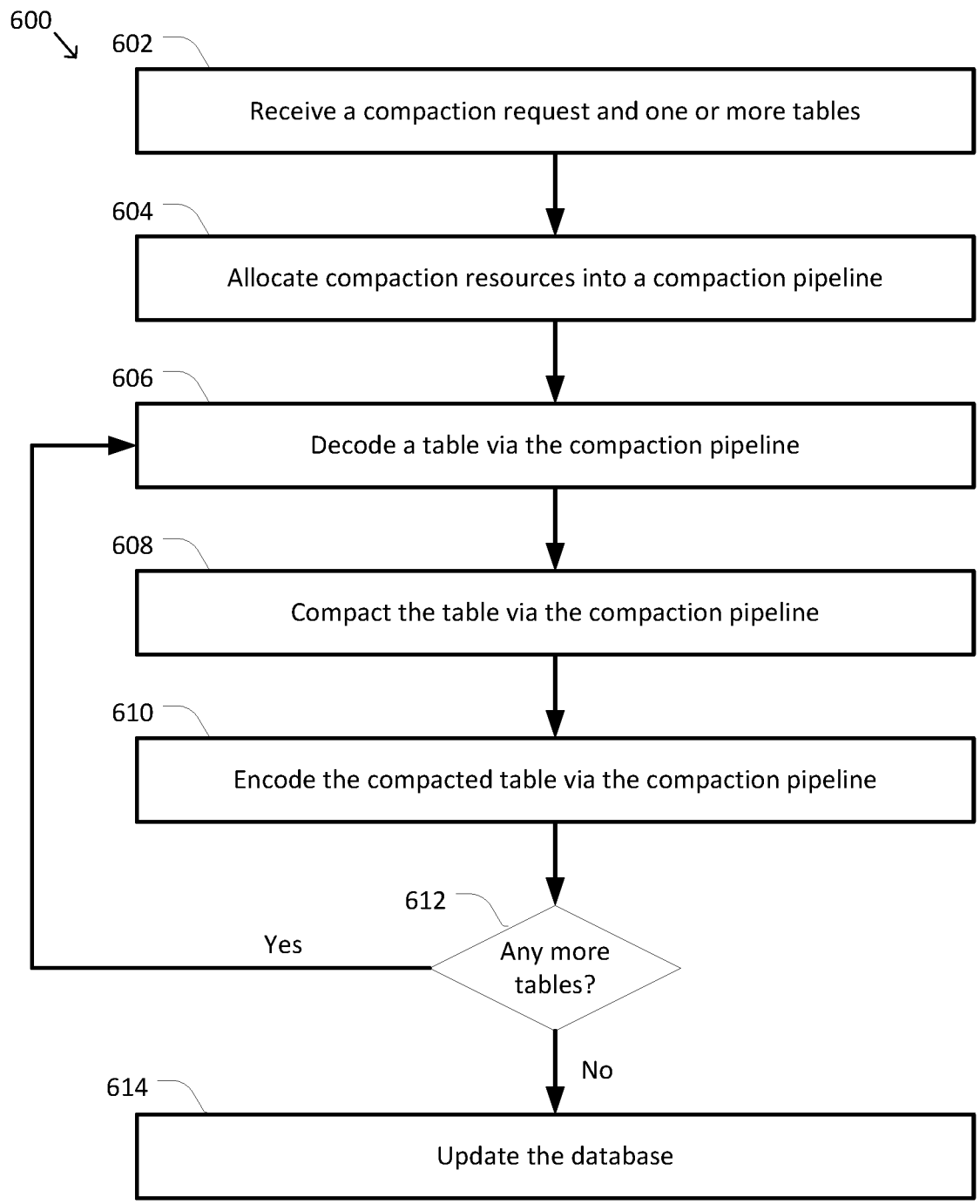
FIG. 6 is a flow diagram of method steps for compacting one or more tables, according to various embodiments.

FIG. 6 is a flow diagram of method steps for compacting one or more tables, according to various embodiments. Although the operations described for the method is described in conjunction with the systems of FIGS. 1-5B, persons of ordinary skill in the art will understand that any system configured to perform the method, in any order, is within the scope of the present disclosure.

As shown, a method 600 begins at step 602, where compactor 402/502 receives a compaction request and one or more tables. Compactor 402/502 can receive the request and tables, which includes the data to be compacted, from CPU 405/505. Compaction requests manager 406/506 transmits the request and tables to load balancer 408/508.

At step 604, load balancer 408/508 allocates compaction resources into a compaction pipeline 430/530. Load balancer 408/508 can allocate decoder engines 410/510, compaction engines 412, KV-stores 512, and/or encoder engines 414/514 into a compaction pipeline 430/530 for handling the compaction task or request, thereby creating a compaction pipeline 430/530 for the compaction task or request. Load balancer 408/508 may allocate the resources dynamically (e.g., on the fly) or periodically to compaction pipeline 430/530.

At step 606, compaction pipeline 430/530 decodes a table via the compaction pipeline 430/530. Load balancer 408/508 transmits data in a first table to decoder engines 410/510 in a compaction pipeline 430/530. The decoder engines 410/510 within the compaction pipeline 430/530 decodes the data from the database format in which the data was received by compactor 402/502 into a common format.

At step 608, compactor 402/502 compacts the table via the compaction pipeline 430/530. In some embodiments, decoder engines 410 in the compaction pipeline 430/530 transmit data in the table (e.g., entries in the table) to compaction engines 412 or KV store 512 in the compaction pipeline 430, which performs compaction operations on the data. In some other embodiments, decoder engines 510 in the compaction pipeline 430/530 insert entries in the table into KV store 512 according to a merging mode to which compactor 502 or compaction pipeline 530 is configured.

At step 610, compactor 402/502 encodes the compacted table via the compaction pipeline 430/530. Encoder engines 414/514 in the compaction pipeline 430/530 receive or retrieve the compacted data from compaction engines 412 or KV store 512 in the compaction pipeline 430/530. Encoder engines 410/510 in the pipeline encode the compacted data back into the original database format of the data.

At step 612, if there are more tables in the compaction request to compact, then method 600 proceeds back to step 606, where compactor 402/502 can proceed to decode, compact, and encode another table via the compaction pipeline. If there are no more tables in the request to compact, then method 600 proceeds to step 614, where compactor 402/502 can provide the compacted table so that it can be used to update a corresponding database.

In sum, compaction in a database can be performed by a compactor separate from a central processing unit (CPU) performing database read and write operations. A compactor separate from the CPU (e.g., implemented on a field-programmable gate array) can have multiple allocable internal compaction modules (also called "compaction resources") that process compaction requests. The compaction resources include multiple decoding engines, multiple compaction engines, and multiple encoding engines that can be dynamically allocated to a plurality of compaction tasks. A load balancer allocates the engines into various compaction pipelines based on the data to be compacted (e.g., the database format with which tables to be compacted are associated), the compaction operation to be performed, the amount of data to be compacted, and/or load balancing considerations. In some embodiments, a key-value store can be implemented in place of one or more of the compaction engines, and table entries can be selectively inserted into the key-value store based on a configurable merging mode.

A technical advantage and improvement of the disclosed techniques is that compaction is performed by a dedicated compactor, which frees up CPU resources for read and write operations. Accordingly, read and write latencies are not significantly affected during compaction. A further technical advantage and improvement is that resources within the compactor are dynamically allocable into various compaction pipelines based on load, type of database being compacted, a type of merging mode, and so on, which further enhances flexibility and/or efficiency in the compaction process so that the compactor can easily be adapted based on the number and/or complexity of the compaction tasks that have been requested. Yet another technical advantage and technical improvement is that compaction pipelines can operate in parallel, thereby support many more compaction tasks concurrently, which further enhances compaction capacity and time to complete a requested compaction task.

1. In some embodiments, a compaction accelerator comprises a compactor separate from a processor performing read and write operations for a database or a data store, wherein the compactor comprises a plurality of compaction resources; wherein the compactor is configured to receive a compaction request and data to be compacted; compact the data via a compaction pipeline to generate compacted data, the compaction pipeline having a first portion of the plurality of compaction resources; and forward the compacted data to the processor, the database, or the data store.

2. The compaction accelerator of clause 1, wherein the at least a portion of the plurality of compaction resources comprises at least one decoder engine, at least one compaction engine, and at least one encoder engine.

3. The compaction accelerator of clauses 1 or 2, wherein the compaction pipeline is configured to convert the data via the at least one decoder engine from a format associated with the database or data store into a format associated with the at least one compaction engine; merge the data via the at least one compaction engine; and convert the merged data via the at least one encoder engine from the format associated with the at least one compaction engine into the format associated with the database or data store.

4. The compaction accelerator of any of clauses 1-3, wherein the format associated with the at least one compaction engine is a sorted string table (SSTable) format.

5. The compaction accelerator of any of clauses 1-4, wherein the at least a portion of the plurality of compaction resources comprises at least one decoder engine, a key-value store, and at least one encoder engine.

6. The compaction accelerator of any of clauses 1-5, wherein the compaction pipeline is configured to convert the data via the at least one decoder engine from a format associated with the database or data store into a format associated with the key-value store; insert at least a portion of the data into the key-value store; obtain the at least a portion of the data from the key-value store; and convert the at least a portion of the data via the at least one encoder engine from the format associated with the at least one compaction engine into the format associated with the database or data store.

7. The compaction accelerator of any of clauses 1-6, wherein the data comprises a plurality of key-value pairs, each key-value pair having a timestamp, and wherein the compaction pipeline is configured to compact the plurality of key-value pairs based on the timestamps and the keys in the plurality of key-value pairs.

8. The compaction accelerator of any of clauses 1-7, wherein the compactor is further configured to: create the compaction pipeline; and allocate the at least a portion of the plurality of compaction resources to the compaction pipeline after receiving the compaction request.

9. The compaction accelerator of any of clauses 1-8, wherein the compactor is further configured to re-allocate at least one compaction resource included in at least a portion of the plurality of compaction resources to a second compaction pipeline.

10. The compaction accelerator of any of clauses 1-9, wherein the compactor is implemented on one or more field-programmable gate arrays (FPGA), graphics processing engines, or application specific integrated chips or circuits (ASICs).

11. In some embodiments, a system comprises a compactor separate from a processor performing read and write operations for a database or a data store, wherein the compactor comprises a plurality of compaction resources; wherein the compactor is configured to receive a compaction request and one or more tables to be compacted; compact the one or more tables via a compaction pipeline to generate a compacted table, the compaction pipeline having a first portion of the plurality of compaction resources; and forward the compacted table to the processor, the database, or the data store.

12. The system of clause 11, wherein the compactor is further configured to create a second compaction pipeline having a second portion of the plurality of compaction resources.

13. The system of clauses 11 or 12, wherein the compaction pipeline and the second compaction pipeline operate in parallel.

14. The system of any of clauses 11-13, wherein the compaction pipeline comprises one or more decoder engines; one or more encoder engines; and one or more compaction engines or a key-value store.

15. The system of any of clauses 11-14, wherein the one or more tables comprise a plurality of entries, each key-value entry having a timestamp, and wherein the compaction pipeline is configured to compact the plurality of entries based on the timestamps and the keys in the plurality of entries.

16. The system of any of clauses 11-15, wherein each of the one or more tables comprises a plurality of entries, and wherein the compaction pipeline is configured to merge the plurality of entries in the one or more tables into the compacted table.

17. In some embodiments, a method of database compaction performed by a compactor separate from a processor performing read and write operations for a database or a data store comprises receiving a compaction request and data to be compacted compacting the data via a compaction pipeline to generate compacted data, the compaction pipeline having a set of compaction resources included in the compactor; and forwarding the compacted data to the processor, the database, or the data store.

18. The method of clause 17, wherein compacting the data comprises converting the data via at least one decoder engine included in the set of compaction resources from a format associated with the database or data store into a format associated with at least one compaction engine included in the set of compaction resources; merging the data via the at least one compaction engine; and converting the merged data via at least one encoder engine included in the set of compaction resources from the format associated with the at least one compaction engine into the format associated with the database or data store.

19. The method of clauses 17 or 18, wherein compacting the data comprises converting the data via at least one decoder engine included in the set of compaction resources from a format associated with the database or data store into a format associated with a key-value store included in the set of compaction resources; inserting at least a portion of the data into the key-value store; obtaining the at least a portion of the data from the key-value store; and converting the at least a portion of the data via at least one encoder engine included in the set of compaction resources from the format associated with the key-value store into the format associated with the database or data store.

20. The method of any of clauses 17-19, further comprising creating the compaction pipeline; and allocating the at least a portion of the set of compaction resources to the compaction pipeline after receiving the compaction request.

Any and all combinations of any of the claim elements recited in any of the claims and/or any elements described in this application, in any fashion, fall within the contemplated scope of the present protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A compaction accelerator comprising:
   a compactor separate from a processor performing read and write operations for a database or a data store, wherein the compactor comprises a plurality of compaction resources;
   wherein the compactor is configured to:
      receive a compaction request and data to be compacted;
      compact the data via a compaction pipeline to generate compacted data, the compaction pipeline having a first portion of the plurality of compaction resources; and
      forward the compacted data to the processor, the database, or the data store.

2. The compaction accelerator of claim 1, wherein the at least a portion of the plurality of compaction resources comprises at least one decoder engine, at least one compaction engine, and at least one encoder engine.

3. The compaction accelerator of claim 2, wherein the compaction pipeline is configured to:
convert the data via the at least one decoder engine from a format associated with the database or the data store into a format associated with the at least one compaction engine;
merge the converted data via the at least one compaction engine; and
convert the merged data via the at least one encoder engine from the format associated with the at least one compaction engine into the format associated with the database or the data store.

4. The compaction accelerator of claim 3, wherein the format associated with the at least one compaction engine is a sorted string table (SSTable) format.

5. The compaction accelerator of claim 1, wherein the at least a portion of the plurality of compaction resources comprises at least one decoder engine, a key-value store, and at least one encoder engine.

6. The compaction accelerator of claim 5, wherein the compaction pipeline is configured to:
convert the data via the at least one decoder engine from a format associated with the database or the data store into a format associated with the key-value store;
insert at least a portion of the converted data into the key-value store;
obtain the at least a portion of the converted data from the key-value store; and
convert the at least a portion of the converted data via the at least one encoder engine from the format associated with the key-value store into the format associated with the database or the data store.

7. The compaction accelerator of claim 1, wherein the data comprises a plurality of key-value pairs, each key-value pair having a timestamp, and wherein the compaction pipeline is configured to compact the plurality of key-value pairs based on the timestamps and keys in the plurality of key-value pairs.

8. The compaction accelerator of claim 1, wherein the compactor is further configured to:
create the compaction pipeline; and
allocate the at least a portion of the plurality of compaction resources to the compaction pipeline after receiving the compaction request.

9. The compaction accelerator of claim 8, wherein the compactor is further configured to re-allocate at least one compaction resource included in at least a portion of the plurality of compaction resources to a second compaction pipeline.

10. The compaction accelerator of claim 1, wherein the compactor is implemented on one or more field-programmable gate arrays (FPGA), graphics processing engines, or application specific integrated chips or circuits (ASICs).

11. A system comprising:
a compactor separate from a processor performing read and write operations for a database or a data store, wherein the compactor comprises a plurality of compaction resources;
wherein the compactor is configured to:
receive a compaction request and one or more tables to be compacted;
compact the one or more tables via a compaction pipeline to generate a compacted table, the compaction pipeline having a first portion of the plurality of compaction resources; and
forward the compacted table to the processor, the database, or the data store.

12. The system of claim 11, wherein the compactor is further configured to create a second compaction pipeline having a second portion of the plurality of compaction resources.

13. The system of claim 12, wherein the compaction pipeline and the second compaction pipeline operate in parallel.

14. The system of claim 11, wherein the compaction pipeline comprises:
one or more decoder engines;
one or more encoder engines; and
one or more compaction engines or a key-value store.

15. The system of claim 14, wherein the one or more tables comprise a plurality of entries, each entry having a timestamp and a key, and wherein the compaction pipeline is configured to compact the plurality of entries based on the timestamps and the keys in the plurality of entries.

16. The system of claim 11, wherein each of the one or more tables comprises a plurality of entries, and wherein the compaction pipeline is configured to merge the plurality of entries in the one or more tables into the compacted table.

17. A method of database compaction performed by a compactor separate from a processor performing read and write operations for a database or a data store, the method comprising:
receiving a compaction request and data to be compacted;
compacting the data via a compaction pipeline to generate compacted data, the compaction pipeline having a set of compaction resources included in the compactor; and
forwarding the compacted data to the processor, the database, or the data store.

18. The method of claim 17, wherein compacting the data comprises:
converting the data via at least one decoder engine included in the set of compaction resources from a format associated with the database or the data store into a format associated with at least one compaction engine included in the set of compaction resources;
merging the converted data via the at least one compaction engine; and
converting the merged data via at least one encoder engine included in the set of compaction resources from the format associated with the at least one compaction engine into the format associated with the database or the data store.

19. The method of claim 17, wherein compacting the data comprises:
converting the data via at least one decoder engine included in the set of compaction resources from a format associated with the database or the data store into a format associated with a key-value store included in the set of compaction resources;
inserting at least a portion of the converted data into the key-value store;
obtaining the at least a portion of the converted data from the key-value store; and
converting the at least a portion of the converted data via at least one encoder engine included in the set of compaction resources from the format associated with the key-value store into the format associated with the database or the data store.

20. The method of claim 17, further comprising:
creating the compaction pipeline; and
allocating the at least a portion of the set of compaction resources to the compaction pipeline after receiving the compaction request.

\* \* \* \* \*